United States Patent
Zijsling et al.

(10) Patent No.: US 9,617,800 B2
(45) Date of Patent: Apr. 11, 2017

(54) CONNECTOR ASSEMBLY

(71) Applicant: SHELL OIL COMPANY, Houston, TX (US)

(72) Inventors: Djurre Hans Zijsling, Rijswijk (NL); Egbert Jan Van Riet, Rijswijk (NL); Mark Michael Shuster, Voorburg (NL)

(73) Assignee: SHELL OIL COMPANY, Houston, TX (US)

( * ) Notice: Subject to any disclaimer, the term of this patent is extended or adjusted under 35 U.S.C. 154(b) by 301 days.

(21) Appl. No.: 14/380,425

(22) PCT Filed: Feb. 21, 2013

(86) PCT No.: PCT/EP2013/053501
§ 371 (c)(1),
(2) Date: Aug. 22, 2014

(87) PCT Pub. No.: WO2013/124386
PCT Pub. Date: Aug. 29, 2013

(65) Prior Publication Data
US 2015/0035274 A1     Feb. 5, 2015

(30) Foreign Application Priority Data

Feb. 23, 2012 (EP) .................................... 12156680

(51) Int. Cl.
*F16L 13/08* (2006.01)
*E21B 17/042* (2006.01)
(Continued)

(52) U.S. Cl.
CPC ............ *E21B 17/042* (2013.01); *E21B 19/16* (2013.01); *F16L 15/001* (2013.01); *F16L 15/04* (2013.01)

(58) Field of Classification Search
USPC ........................ 285/40, 390, 333, 334, 289.5
See application file for complete search history.

(56) References Cited

U.S. PATENT DOCUMENTS

| | | |
|---|---|---|
| 1,859,311 A | 5/1932 | McEvoy |
| 1,875,708 A | 9/1932 | Couhig |

(Continued)

FOREIGN PATENT DOCUMENTS

| | | |
|---|---|---|
| CH | 557499 A | 12/1974 |
| CN | 101722403 | 6/2010 |

(Continued)

OTHER PUBLICATIONS

PCT International Search Report, Application No. PCT/EP2013/053501 dated Aug. 16, 2013.

*Primary Examiner* — Aaron Dunwoody

(57) ABSTRACT

The invention provides a connector assembly for interconnecting tubular elements. The connector assembly comprises at least one pin member, at least one box member, and for each box member a respective coating layer. Each pin member has a threaded outer surface and each box member has a threaded inner surface allowing the pin member and the box member to be screwed together. Herein the respective coating layer is positioned between the threaded surfaces of the pin member and the box member. Each coating layer is of a softer material than said threaded surfaces. The connector assembly further comprises means for removing excess coating material during make up of the pin member and the box member.

21 Claims, 5 Drawing Sheets

(51) Int. Cl.
*E21B 19/16* (2006.01)
*F16L 15/00* (2006.01)
*F16L 15/04* (2006.01)

(56) References Cited

U.S. PATENT DOCUMENTS

| | | | |
|---|---|---|---|
| 2,127,943 A | 8/1938 | Harry | |
| 2,136,458 A | 11/1938 | Olson | |
| 2,140,467 A | 12/1938 | Clifton | |
| 2,539,056 A | 1/1951 | Brown et al. | |
| 3,822,902 A * | 7/1974 | Maurer | E21B 17/042 |
| | | | 285/332.2 |
| 4,468,309 A | 8/1984 | White | |
| 4,688,832 A | 8/1987 | Ortloff et al. | |
| 4,962,579 A | 10/1990 | Moyer et al. | |
| 5,212,885 A | 5/1993 | Buonodono et al. | |
| 5,398,975 A * | 3/1995 | Simmons | F16L 58/10 |
| | | | 285/333 |
| 6,047,997 A | 4/2000 | Olivier | |
| 6,349,739 B1 * | 2/2002 | Burgoni | F02M 57/02 |
| | | | 123/470 |
| 6,419,147 B1 | 7/2002 | Daniel | |
| 6,514,631 B1 | 2/2003 | Yamamoto et al. | |
| 6,746,057 B2 | 6/2004 | Goto et al. | |
| 6,860,420 B2 | 3/2005 | Filippov et al. | |
| 7,107,663 B2 | 9/2006 | Ellington et al. | |
| 7,571,936 B2 * | 8/2009 | Schneider | F16B 7/182 |
| | | | 138/96 R |
| 7,900,968 B2 * | 3/2011 | Camwell | E21B 17/028 |
| | | | 285/333 |
| 8,042,841 B2 * | 10/2011 | Viegener | F16L 15/001 |
| | | | 285/333 |
| 8,205,680 B2 | 6/2012 | Cook et al. | |
| 9,194,515 B2 * | 11/2015 | Oshima | E21B 17/08 |
| 2002/0014514 A1 | 2/2002 | Shimizu et al. | |
| 2003/0047588 A1 | 3/2003 | Filippov et al. | |
| 2003/0168858 A1 | 9/2003 | Hashem | |
| 2004/0130152 A1 * | 7/2004 | DeLange | E21B 17/042 |
| | | | 285/334 |
| 2004/0195826 A1 | 10/2004 | Goto | |
| 2005/0093250 A1 | 5/2005 | Santi et al. | |
| 2007/0170722 A1 | 7/2007 | Reynolds et al. | |
| 2010/0096143 A1 | 4/2010 | Angman | |
| 2010/0173172 A1 | 7/2010 | Killian et al. | |
| 2013/0220636 A1 * | 8/2013 | Drenth | E21B 17/042 |
| | | | 166/380 |
| 2016/0186332 A1 | 6/2016 | Kriesels et al. | |

FOREIGN PATENT DOCUMENTS

| | | |
|---|---|---|
| GB | 465438 A | 5/1937 |
| JP | 11062939 A | 3/1999 |
| WO | 2004005665 | 1/2004 |
| WO | 2010083097 | 7/2010 |
| WO | WO 2015014989 | 2/2015 |

* cited by examiner

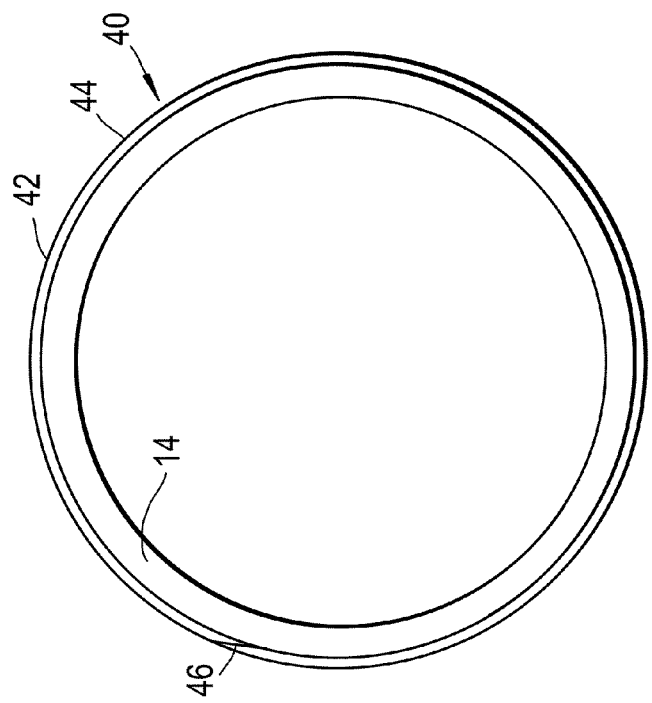
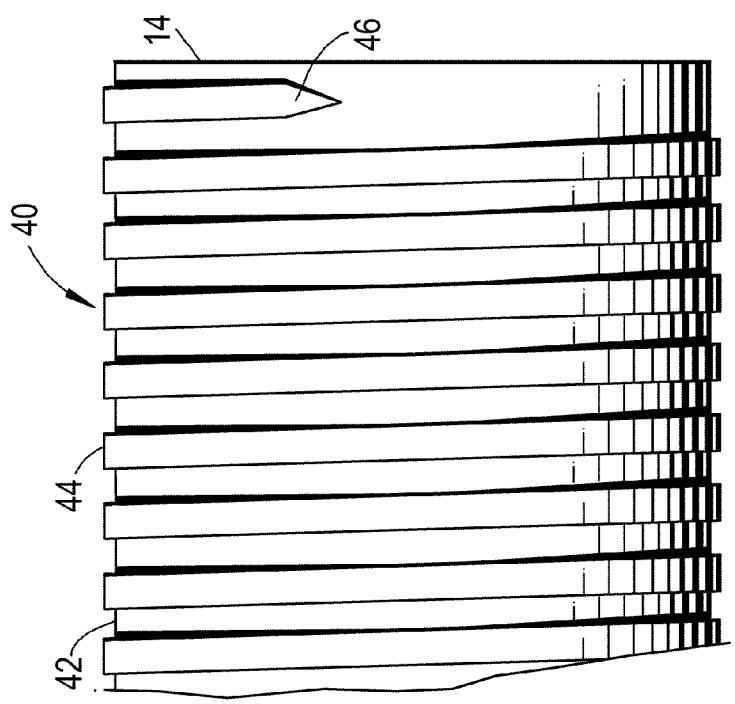

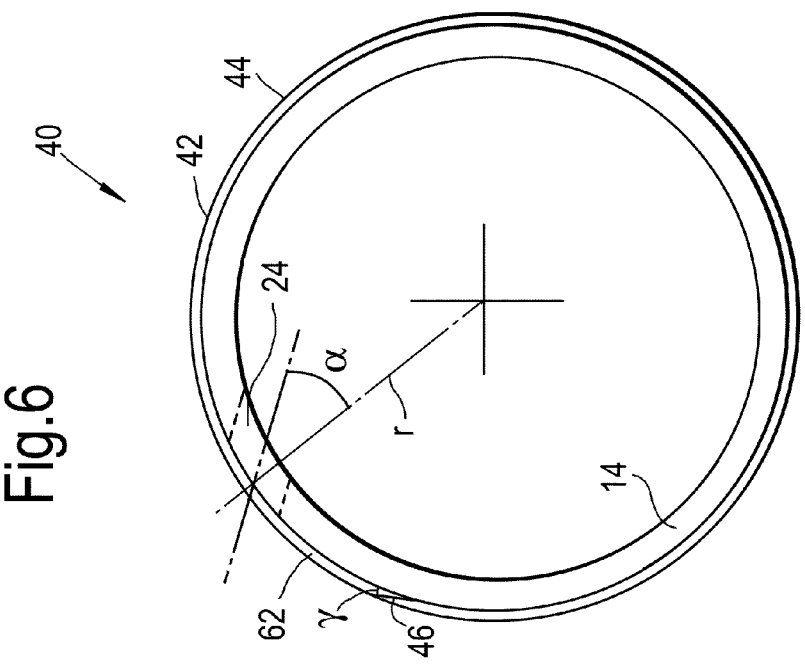
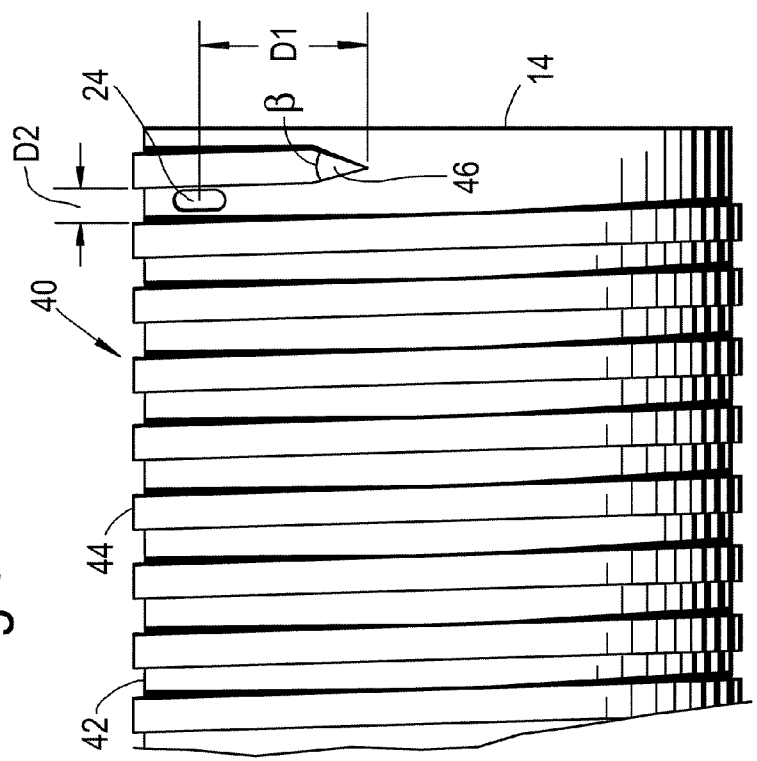

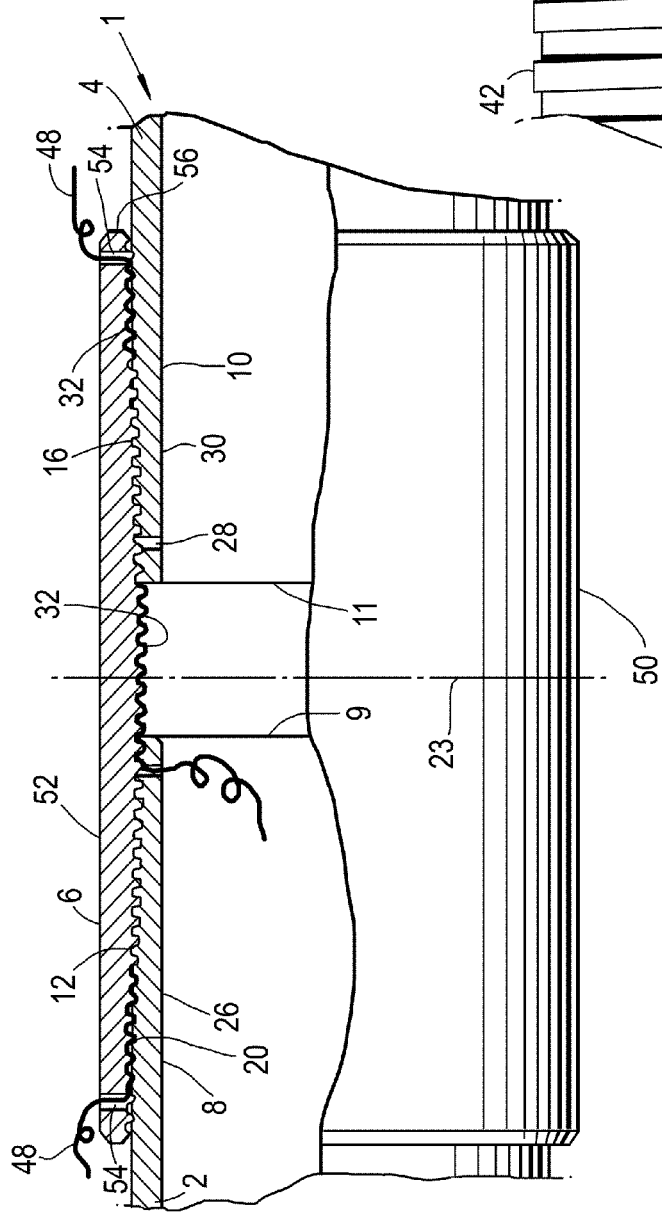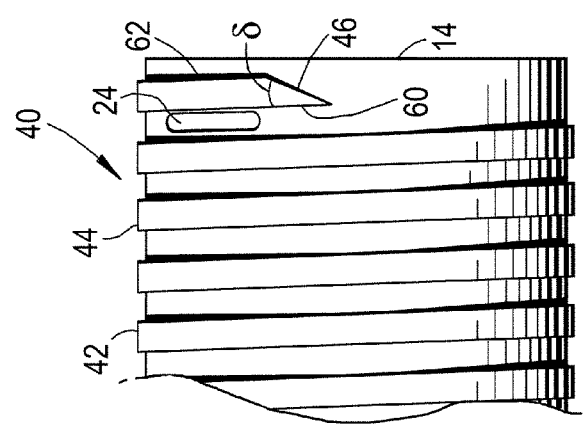

CONNECTOR ASSEMBLY

PRIORITY CLAIM

The present application is a National Stage (§371) application of PCT/EP2013/053501, filed Feb. 21, 2013, which claims priority from European Application 12156680.6, filed Feb. 23, 2012, each of which are hereby incorporated by reference in their entirety.

The present invention relates to a connector assembly for interconnecting tubular elements. The connector assembly includes a pin member and a box member, the pin member having a threaded outer surface and the box member having a corresponding threaded inner surface allowing the pin member and box member to be screwed together.

Connectors of this type are generally used in oilfield applications, for instance to connect sections of wellbore casing or production tubing. Often, connectors for oilfield applications are required to provide liquid-tight and/or gas-tight sealing and to have a strength at least approximately equal to the body strength of the pipe sections joined by the connectors.

An API (American Petroleum Institute) threaded connector is a commonly used type of connector which performs relatively well at relatively low cost. The API however may not always provide reliable gas-tight sealing. In view thereof the API threaded connectors are generally primarily used for liquid service applications, while more expensive premium connections are used for applications where gas-tight sealing is required, for instance in production tubing of gas wells.

There is a need to adapt API threaded connectors for applications whereby gas-tight sealing is required. In order to improve the gas sealability of API threaded connectors it has been proposed to apply a soft metal plating to the threaded surfaces. Examples of such plating material include zinc phosphate, zinc and tin.

U.S. Pat. No. 5,212,885 discloses a threaded connector wherein the threaded section of each pin member is marked with a band, and wherein the threaded surface of the box member is plated with tin. A thread lubricant is applied to the threads of the box member, and the pin and box members are screwed together until the face of the box member overlaps the band. The connection is considered acceptable if the face of the box member is properly positioned over the band on the pin member, and if the make-up torque is within predetermined limits.

However, proper make-up of the connector of U.S. Pat. No. 5,212,885 may be difficult or impossible if the coating layer is too thick. In particular, unallowable deformation of the pin member and/or the box member can occur. Also, the make-up torque can become excessive, and poor thread engagement can occur which negatively impacts performance of the connector.

It is an object of the present invention to provide an improved connector which overcomes the problems of the prior art.

In accordance with the invention there is provided a connector assembly for interconnecting tubular elements, comprising at least one pin member, at least one box member, and for each box member a respective coating layer, each pin member having a threaded outer surface and each box member having a threaded inner surface allowing the pin member and the box member to be screwed together whereby the respective coating layer is positioned between the threaded surfaces of the pin member and the box member, each coating layer being of a softer material than said threaded surfaces, the connector assembly further comprising means for removing excess coating material from the coating layer during screwing of the pin member and the box member together.

By removing excess coating material of the coating layer during make-up of the connector, it is achieved that the thickness of the coating layer becomes accurately adjusted to the dimensions of the engaged threaded surfaces of the pin member and the box member, even if the initial coating layer is too thick to fit properly between the threaded surfaces.

Suitably the coating layer is susceptible of plastic deformation due to screwing of the pin member and the box member together, and wherein said means for removing excess coating material from the coating layer comprises at least one passage arranged to allow said excess coating material to be pressed into the passage as a result of said plastic deformation, each passage being provided in one of the pin member and the box member. In this manner the excess coating material is extruded into the passage from where it can be adequately discharged. An additional advantage of plastic deformation of the coating material is that any undesired clearance between the engaged threaded surfaces is filled with coating material so that gas-tight sealing of the engaged threaded surfaces is achieved.

In case the passage is provided in the pin member, and the threaded outer surface of the pin member tapers to a smaller diameter at an end surface of the pin member, the passage is preferably formed near said end surface of the pin member. Preferably, the passage formed in the pin member extends from an outer surface to an inner surface of the pin member.

Similarly, in case the passage is provided in the box member, and the threaded inner surface of the box member tapers to a larger diameter at an end surface of the box member, the passage is preferably formed near said end surface of the box member. To adequately discharge the excess coating material, the passage formed in the box member preferably extends from an inner surface to an outer surface of the box member.

In a modified embodiment, said means for removing excess material from the coating layer comprises a cutting edge provided at one of the pin member and the box member, the cutting edge being arranged to cut away the excess coating material upon screwing of the pin member and the box member together. Suitably, the cutting edge is provided at the threaded outer surface of the pin member. For example, the cutting edge is formed by a sharp end of the thread of the threaded outer surface.

Suitably the coating layer includes a soldering or brazing material, and wherein a soldering or brazing flux is applied to a surface selected from the threaded outer surface of the pin member and the threaded inner surface of the box member so as to promote bonding of the coating layer to the selected surface upon a temperature increase of the selected surface.

In a preferred embodiment, at least part of the temperature increase is due to friction between the pin member and the box member during screwing of the pin member and the box member together. In an embodiment, the coating layer includes a soldering material and the entire temperature increase required to spread said coating layer over the selected surface is due to friction between the pin member and the box member during make-up of the pin member and the box member. Herein, said required temperature may be relatively low, for instance below 400 degree C. or even below 150 degree C. Said temperature is for instance in the order of 100 to 125 degree C.

The threaded outer surface of the pin member and the threaded inner surface of the box member overlap each other along an overlapping length when the pin member and the box member are screwed together. In case bonding of the coating layer to the bonding surface appears to be too strong, which may lead to relatively high friction forces between the engaged threaded surfaces during make-up of the connector, it is preferred that the coating layer is absent along an uncoated portion of said overlapping length. Preferably, the coating layer is present along opposite end portions of the overlapping length, wherein the uncoated portion extends between said opposite end portions.

In a preferred embodiment, the connector assembly comprises a first said box member, a second said box member, a first said coating layer and a second said coating layer, wherein during a first stage of use the pin member is screwed to the first box member whereby the first coating layer is positioned between the threaded surfaces of the pin member and the first box member, and wherein during a second stage of use the pin member is screwed to the second box member whereby the second coating layer is positioned between the threaded surfaces of the pin member and the second box member.

Sometimes it may be required to break the connection between the pin member and the first box member for operational reasons. By replacing the first box member and the first coating layer with the second box member and the second coating layer after the connection between the pin member and the first box member has been broken, it is achieved that the connector fulfils the general requirement for qualification in the oilfield industry that the connector must be able to be made-up and broken at least three times without performance deterioration below the specified operating envelope. In order to ensure that the thread of the pin member remains undamaged after repeatedly screwing and unscrewing the connection, it is preferred that the first coating layer is bonded to the threaded inner surface of the first box member, and that the second coating layer is bonded to the threaded inner surface of the second box member.

The invention will be described hereinafter in more detail and by way of example, with reference to the accompanying drawings in which:

FIG. 1 schematically shows an embodiment of a connector assembly according to the invention, partly in longitudinal section;

FIG. 2 schematically shows a detail of the embodiment of FIG. 1;

FIG. 3 schematically shows an embodiment of a modified pin member for use in the connector assembly of the invention;

FIG. 4 schematically shows an end view of the modified pin member of FIG. 3.

FIG. 5 schematically shows another embodiment of a modified pin member for use in the connector assembly of the invention;

FIG. 6 schematically shows an end view of the modified pin member of FIG. 5;

FIG. 7 shows another embodiment of a connector according to the invention, partly in longitudinal section;

FIG. 8 shows yet another embodiment of a modified pin member for use in the connector assembly of the invention.

In the Figures, like reference signs relate to like components.

Figure 1:
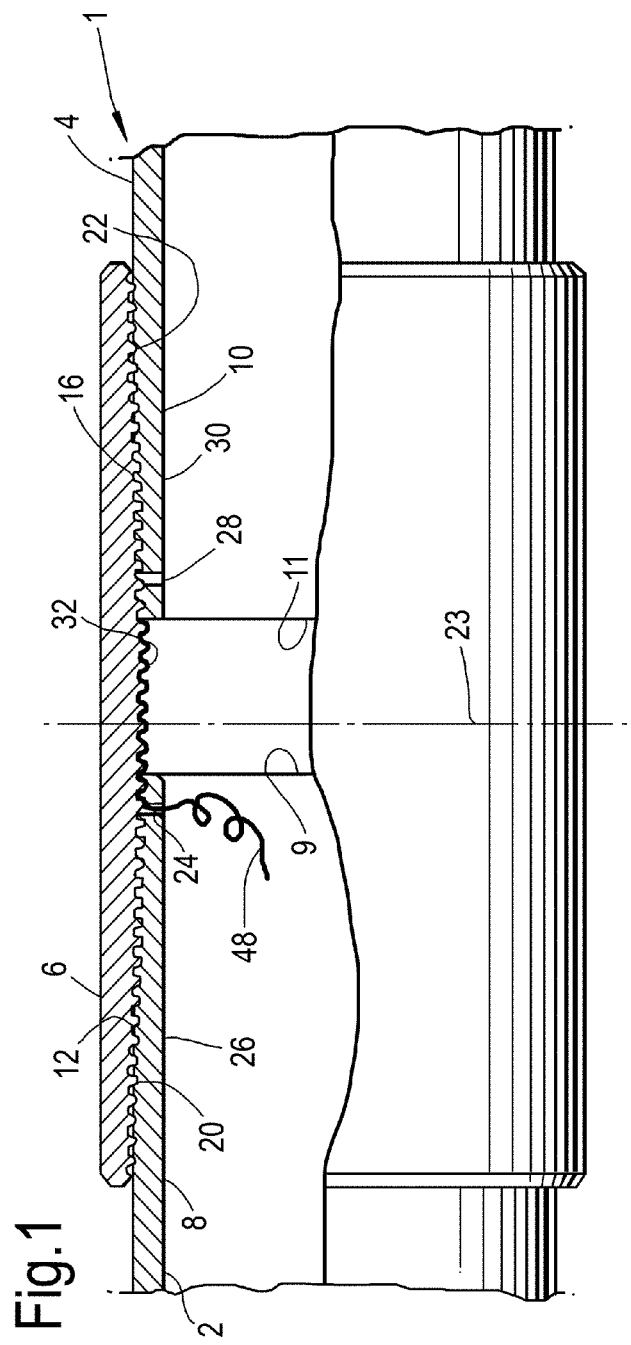
Figure 2:
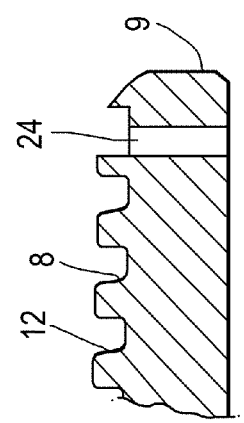

Referring to FIGS. 1 and 2 there is shown a connector 1 for interconnecting two tubular elements 2, 4. The connector 1 comprises a steel box member 6, a first steel pin member 8 having tip 9 and being integrally formed with tubular element 2, and a second steel pin member 10 having tip 11 and being integrally formed with tubular element 4. The box member 6 and the pin members 8, 10 are of tubular shape. The first pin member 8 has a threaded outer surface 12 tapering slightly radially inward towards the tip 9 of the first pin member 8. Similarly, the second pin member 10 has a threaded outer surface 16 tapering slightly radially inward towards the tip 11 of the second pin member 10. The box member 6 has a first threaded inner surface 20 corresponding to the threaded outer surface 12 of the first pin member 8 so as to allow the first pin member 8 to be screwed to the box member 6, and a second threaded inner surface 22 arranged opposite the first threaded inner surface 20 and corresponding to the threaded outer surface 16 of the second pin member 10 so as to allow the second pin member 10 to be screwed to the box member 6. In the configuration of FIG. 1, the first pin member 8 is fully screwed to the box member 6, while the second pin member 10 is only partially screwed to the box member 6. Reference sign 23 indicates an axis of symmetry of the box member 6.

The first pin member 8 is provided with a through-bore 24 located near tip 9, whereby the through-bore 24 extends from the threaded outer surface 12 to an inner surface 26 of the first pin member 8. The through-bore 24 is shown in FIG. 2 in more detail. In similar manner, the second pin member 10 is provided with a through-bore 28 located near tip 11, whereby the through-bore 28 extends from the threaded outer surface 16 to an inner surface 30 of the second pin member 10. Furthermore, the box member 6 is internally provided with a coating layer 32 of a relatively soft metal. Relatively soft metal herein implies that the metal of the coating layer is softer than the steel of the respective threaded surfaces 12, 16, 20, 22. Suitable metals for the coating layer 32 include for instance Babbitt, pure metals such as copper and tin or alloys of such metals.

Deposition of such soft metal on the threaded inner surfaces 20, 22 of the box member 6 is suitably done by for example flame spraying or electro deposition. Herein the coating the coating layer 32 is for instance bonded to the threaded inner surfaces 20, 22.

In an embodiment, the coating layer 32 may extend along less than the full length of each inner threaded inner surface 20, 22. Rather, the coating layer 32 extends from the symmetry axis 23 in axial direction along portions of the threaded inner surfaces 20, 22.

Reference is further made to FIGS. 3 and 4 showing a modified pin member 40 for use in the connector 1. The modified pin member 40 has a threaded outer surface 42 with thread 44 ending in a sharp cutting edge 46 near end surface 14. In the present example, the modified pin member 40 is not provided with a through-bore. However, if desired the modified pin member may be provided with a through-bore like in the embodiment of FIGS. 1, 2.

FIGS. 5 and 6 show another embodiment of the pin member 40 for use in the connector assembly 1. The pin member 40 has the threaded outer surface 42 with thread 44 ending in the sharp cutting edge 46 near end surface 14. The pin member 40 is provided with through-bore 24. In top view (FIG. 5), the through-bore or opening 24 may be (slightly) elliptical, to improve the discharge of excess material. Also, the opening 24 may be arranged at an angle α with respect to the radius r (FIG. 6).

Besides or in addition to the first pin member 8, also the box member may be provided with a through-bore 54, preferably located near box end 50, near end surface 56.

Herein, the through-bore 54 may extend from the threaded inner surface 16 to an outer surface 52 of the box member 6 (FIG. 7). Furthermore, the box member 6 or respective pin member 8 may be provided with a coating layer 32 near the openings 54 in the box member.

FIG. 8 shows another yet embodiment of the pin member 40 for use in the connector assembly 1. The pin member 40 has the threaded outer surface 42 with thread 44 ending in the sharp cutting edge 46 near end surface 14. The pin member 40 is provided with through-bore 24, which is elliptical. The sharp edge 46 has a first side 60 which is aligned with the threads 44. A second side 64 is arranged at an angle δ with respect to the first side, and extends towards the opposite side 62 of said thread 44.

Figure 9:
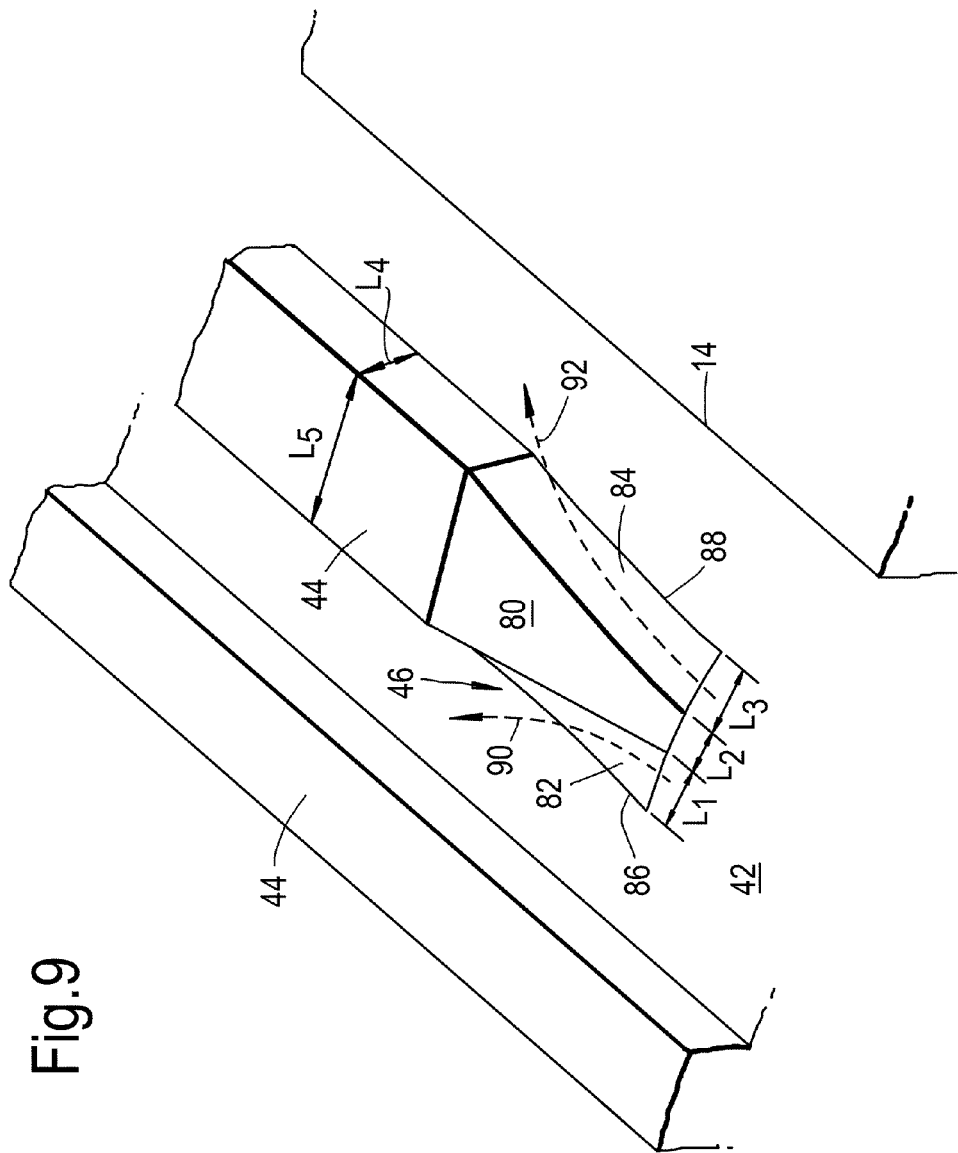
FIG. 9 shows another embodiment of a sharp cutting edge for the connector assembly of the invention.

FIG. 9 shows an embodiment of the cutting edge 46 of the thread 44. The cutting edge comprises a top surface 80 which inclines from the surface 42 to the top of the thread 44. In a side elevation, the top surface 80 will resemble the cutting edge as shown in FIG. 6, i.e. arranged at an angle γ with respect to the surface 42. The cutting edge 46 is also provided with left and right side surfaces 82, 84 respectively. The side surfaces 82, 84 have sides 86, 88 which are aligned with the sides of the thread 44. The side surfaces 82, 84 are inclined, starting at the sides 86, 88 respectively towards the top surface 80. The side surfaces 82, 84 improve the discharge of excess material as indicated by arrows 90, 92 respectively.

At the front end, the left side surface 82, top surface 80 and right side surface 84 have a width L1, L2, L3 respectively. The height and width of the thread is indicated by L4 and L5 respectively. Herein, the sum of L1+L2+L3 equals L5. In a preferred embodiment, the ratio of L1:L2:L3 is about 1:1:1.

In a practical embodiment, the ratio of largest diameter to smallest diameter of the opening 24 is for instance in the range of 1:1 to 3:1 or more, for instance about 1:2. The angle α may be in the range of 0 to 30 degrees.

The sharp cutting edge 46 may have a leading edge which is V-shaped, having an angle β (in top view, see FIG. 5). The angle β may be in the range of about 20 to 180 degrees. Preferably the angle β is in the range of about 20 to 40 degrees. In side view (FIG. 6), the leading edge of the sharp cutting edge 46 may be arranged at an angle γ with respect to the tangent of the outer surface of the pin 40. Herein, the angle γ may be in the range of about 1 to 60 degrees, for instance in the range of about 25 to 45 degrees. When the angle β is about 180 degrees, the angle γ will preferably be in the range of 1 to 60 degrees. In the embodiment of FIG. 8, the angle δ may be in the range of about 10 to 45 degrees, and preferably in the range of about 20 to 30 degrees.

The opening 24 may be arranged at a distance D1 from said leading edge of the edge 46. Herein, D1 may be less the a single rotation around the tip 40. Optimally, distance D1 is in the range of about 20% to 60% of a single rotation around the pin 40.

The opening or through-bore 24 may have a diameter which is in the order of the distance D2 between the threads (FIG. 5) or less. For instance, the diameter of the opening 24 is in the range of about 70 to 90% of D2.

Although not shown, the end of the box member 6 may be provided with an opening 24 and/or a sharp cutting edge, similar to the end of the pin member shown in FIGS. 3 to 6. Such opening and/or cutting edge may be provided in addition to, or as an alternative for, the cutting edge or the opening in the pin member.

During normal use of the embodiment of FIGS. 1, 2 the pin members 8, 10 are initially screwed hand-tight to the box member 6, and then fully screwed to the box member 6 using a suitable wrench until the desired make-up torque is reached or until a mark (not shown) on each pin member arrives at an end face of the box member. At the stage shown in FIG. 1, the second pin member 10 has been screwed hand-tight to the box member 6 until the tip 11 of second pin member 10 touches the coating layer 32. The first pin member 8 has been fully screwed to the box member 6 using a wrench whereby the coating layer 32 is squeezed between the threaded outer surface 12 of the first pin member 8 and the threaded inner surface 20 of the box member 6. Due to the softness of the coating material and the squeezing action of the engaged threaded surfaces 12, 20, the coating layer 32 deforms plastically and becomes pressed into the through-bore 24 of pin member 8. As a result excess coating material 48 that is present between the engaged threaded surfaces 12, 20 is extruded through the through-bore 24. Similarly, when the second pin member 10 is screwed further into the box member 6 using a wrench, the coating layer 32 becomes squeezed between the threaded outer surface 16 of the second pin member 10 and the threaded inner surface 22 of the box member 6. Any excess coating material of the coating layer 32 that is present between the engaged threaded surfaces 16, 22 is thereby extruded through the through-bore 28. The remaining coating layer 32 fits accurately between the engaged threaded surfaces 12, 20 and the engaged threaded surfaces 16, 22. A gas-tight seal is thereby provided to the connector 1, without causing excessive make-up torque or intolerable deformation of the pin and box members.

During normal use of the modified embodiment of FIGS. 3 and 4, the pin member 40 is screwed to the box member 6. Any excess coating material of the coating layer 32 is cut away by the sharp cutting edge 46 of thread 44 during screwing of the pin member 40 and the box member 6 together.

Thus, the connector of the invention prevents problems caused by the coating layer being too thick and enables proper distribution of the coating across the selected surface. Also, the connector enables gas-tight sealing of the connector. Herein, the invention enables to improve a relatively cost-effective API connector to provide these advantages, thus providing a relatively inexpensive gas-tight connector.

The invention is not limited to the above-described embodiments thereof, wherein various modifications are conceivable within the scope of the appended claims. Features of respective embodiments may for instance be combined.

The invention claimed is:

1. A connector assembly for interconnecting tubular elements, comprising:
   at least one pin member having a threaded outer surface;
   at least one box member having a threaded inner surface corresponding to the threaded outer surface of the pin member allowing the pin member and the box member to be screwed together;
   at least one coating layer which is positioned between the threaded outer surface and the threaded inner surface, each coating layer being of a softer material than said threaded surfaces; and
   removal means for removing excess coating material from the coating layer during screwing of the pin member and the box member together,
wherein the coating layer includes a brazing or soldering material, and wherein a brazing or soldering flux is applied to a surface selected from the threaded outer surface of the pin member and the threaded inner surface of the box member to promote bonding of the coating layer to the selected surface upon a temperature increase of the selected surface up to a required temperature.

2. The connector assembly of claim 1, the removal means comprising at least one passage, each passage being provided in one of the pin member and the box member,
wherein said passage formed in the pin member extends from an outer surface to an inner surface of the pin member and wherein said passage formed in the box member extends from an inner surface to an outer surface of the box member.

3. The connector assembly of claim 2, wherein the coating layer is susceptible of plastic deformation due to screwing of the pin member and the box member together, and
wherein said at least one passage allows said excess coating material to be pressed into the passage as a result of said plastic deformation.

4. The connector assembly of claim 2, said at least one passage comprising a pin passage which is provided near an end surface of the pin member.

5. The connector assembly of claim 2, said at least one passage comprising a box passage which is provided near an end surface of the box member.

6. The connector assembly of claim 2, said at least one passage being arranged at an angle α with respect to the radius r of the connector.

7. The connector assembly of claim 6, wherein the angle α is in the range of about 0 to 30 degrees.

8. The connector assembly of claim 2, said at least one passage being elliptical.

9. The connector assembly of claim 8, the ratio of largest diameter to smallest diameter of the at least one passage being is in the range of 1:1 to 3:1 or more.

10. The connector assembly of claim 1, wherein the removal means comprise a cutting edge provided at one of the pin member and the box member, the cutting edge being arranged to cut away at least part of the excess coating material upon screwing of the pin member and the box member together.

11. The connector assembly of claim 10, wherein the cutting edge is provided at the threaded outer surface of the pin member.

12. The connector assembly of claim 10, wherein the cutting edge is formed by a sharp end of the thread of the threaded outer surface of the pin member.

13. The connector assembly of claim 10, wherein the cutting edge comprises:
a top surface which is inclined from the threaded outer surface to a top of the thread;
a left side surface arranged on the left side of the top surface; and
a right side surface arranged on the right side of the top surface.

14. The connector assembly of claim 13, wherein a width of the left side surface, the top surface and the right side surface is about the same at a front end of the cutting edge.

15. The connector assembly of claim 1, wherein at least part of the temperature increase is due to friction between the pin member and the box member during screwing of the pin member and the box member together.

16. The connector assembly of claim 15, wherein said temperature increase required to spread said coating layer over the selected surface is due to friction between the pin member and the box member during make-up of the pin member and the box member.

17. The connector assembly of claim 1, wherein said required temperature is below 400 degree C.

18. A method for interconnecting tubular elements of a connector assembly, comprising:
providing at least one pin member having a threaded outer surface;
providing at least one box member having a threaded inner surface corresponding to the threaded outer surface of the pin member allowing the pin member and the box member to be screwed together;
whereby at least one coating layer which is positioned between the threaded outer surface and the threaded inner surface, each coating layer being of a softer material than said threaded surfaces wherein the coating layer includes a brazing or soldering material;
screwing the pin member and the box member together whereby removing excess coating material from the coating layer during screwing of the pin member and the box member together; and
applying a brazing or soldering flux to a surface selected from the threaded outer surface of the pin member and the threaded inner surface of the box member to promote bonding of the coating layer to the selected surface upon a temperature increase of the selected surface up to a required temperature.

19. The method of claim 18, wherein at least part of the temperature increase is due to friction between the pin member and the box member during screwing of the pin member and the box member together.

20. The method of claim 18, wherein said temperature increase required to spread said coating layer over the selected surface is due to friction between the pin member and the box member during make-up of the pin member and the box member.

21. The method of claim 18, wherein said required temperature is below 400 degree C.

* * * * *